April 16, 1929.  S. B. HEATH  1,709,398
METHOD OF PREPARING EPSOM SALTS
Filed Feb. 23, 1925
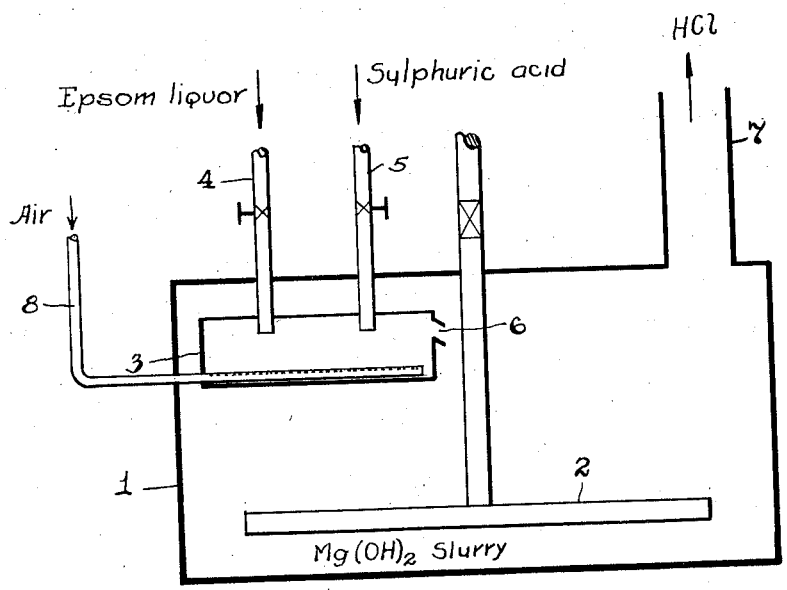
INVENTOR.
Sheldon B. Heath
BY
Fay, Oberlin & Fay
ATTORNEYS Patented Apr. 16, 1929.

1,709,398

UNITED STATES PATENT OFFICE.

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN.

METHOD OF PREPARING EPSOM SALTS.

Application filed February 23, 1925. Serial No. 10,984.

In the synthetic preparation of Epsom salts, which is the heptahydrate form of magnesium sulphate, $MgSO_4, 7H_2O$, one of the raw materials entering into the manufacture is magnesium hydroxide, $Mg(OH)_2$. The latter is obtained from naturally occurring brines by treatment with lime and inasmuch as it is practically impossible to wash such hydroxide completely free from the chlorides occurring in such brine, it constitutes the source of chlorides which occur in the liquors from which Epsom salts are crystallized. When the chloride in the liquor to be crystallized exceeds approximately 3.5 per cent of sodium chloride (the chloride titration being calculated to per cent of this particular chloride), it becomes impossible to obtain Epsom salts with chloride content below the U. S. P. limit, and in the past this high chloride mother liquor has had to be used to make magnesium sulphate for technical use or worked up in other processes.

The object of the present invention is to provide an improved process by which the chloride content of the liquor to be crystallized may be kept so low that Epsom salts well below the U. S. P. limit in chloride content may be made continuously.

To the accomplishment of this and related ends, the invention, then, consists of the steps and means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

The single figure there appearing is a more or less diagrammatic representation of an apparatus designed for carrying out the present improved method or process.

The essential step in the process as heretofore operated consisted in creaming up the washed magnesium hydroxide with weak mother liquor returned from the crystallizing pans, in the neutralizer, the latter being a brick lined steel tank. Sulphuric acid (60° Bé.) was then run in with agitation until the hydroxide was almost completely neutralized. The batch was then filtered, its gravity adjusted and run to pans to cool and crystallize. No appreciable amount of chloride is eliminated in the neutralizer when operated as just described. However, I have found that if concentrated Epsom salt liquor containing chlorides is mixed with concentrated sulphuric acid in the proper proportion, a part of the chloride content will be eliminated as gaseous hydrochloric acid. I have further found that the removal of chloride is more complete:— (1) the stronger the sulphuric acid is; (2) the more concentrated the mother liquor is; (3) the hotter the sulphuric acid is; (4) the hotter the mother liquor is; and (5) the greater the ratio of sulphuric acid to mother liquor for a given set of conditions.

As an illustration of the practical application of the foregoing to the manufacture of U. S. P. Epsom salts, I mix 1½ volumes of 41° Bé. Epsom salts mother liquor containing 3.5 per cent sodium chloride at 80° C. with 1 volume of 98 per cent sulphuric acid, such acid being preferably heated to approximately 120° C. and the mother liquor to a temperature for example of 90 to 95° C. Under the conditions stated, approximately 75 per cent of the chloride originally present in such mother liquor will be removed as gaseous hydrochloric acid. The mother liquor thus treated and strongly acid with sulphuric acid is then used to neutralize more magnesium hydroxide.

The ratios of mother liquor to 98 per cent sulphuric acid, which give the greatest chloride elimination with the least amount of acid, are 1½ volumes of 41° Bé. mother liquor at 90° C. to 1 volume of 98 per cent sulphuric acid cold; and 2 volumes of 41° Bé. mother liquor at 90° C. to 1 volume of 98 per cent sulphuric acid at 100° C. Each of the above mixtures reduces the sodium chloride content to less than 1 per cent of the original mother liquor. Higher ratios of volume of mother liquor to acid may be used, but the chloride removal is not so complete and results chiefly from local concentration at the point where the sulphuric acid is run into the mother liquor rather than an equilibrium condition existing in the mixture. Thus, a ratio of 10 volumes of 41° Bé. motor liquor at 90° C. to 1 volume of 98 per cent sulphuric acid at 100° C. on mixing results in a reduction of the chloride content of only 0.5 per cent sodium chloride.

In carrying out my improved process in practice, the hot concentrated mother liquor and sulphuric acid are preferably intermixed continuously and the resultant acidified liquor is similarly continuously intermixed with a body of magnesium hydroxide, the hydrochloric acid evolved in the first step being continuously removed. For the purpose of carrying out the several steps just set forth, the specially designed apparatus illustrated in the drawing may be advantageously employed. In such apparatus, a batch of the magnesium hydroxide with the necessary amount of water to make a mixture of the proper consistency is placed in a closed main reaction chamber 1, preferably consisting of a brick lined steel tank fitted with an agitator 2. Substantially included within said chamber 1 is a supplemental container 3 in the form of a lead lined and covered steel box to which the hot concentrated Epsom liquor and concentrated sulphuric acid are continuously supplied in the proper proportion through valve controlled pipes 4 and 5, respectively. From such container 3 the resulting acidified mother liquor overflows continuously through a launder 6 into the main chamber or tank 1. The hydrochloric acid gas evolved from the reaction of the sulphuric acid with the mother liquor is drawn out through a stack 7 to an absorber and if desired, air may be introduced through a perforated pipe 8 or by equivalent means into the mixture in chamber 3 to blow out more of such hydrochloric acid gas than would be evolved as a result of its own vapor pressure driving it off. The acid mother liquor overflowing from container 3 into the magnesium hydroxide slurry in the bottom of tank 1 is of course at once neutralized and when substantially all of the magnesium hydroxide has been converted into the desired sulphate, the operation is temporarily interrupted and the completed batch withdrawn, filtered and set aside to cool and crystallize. It will be understood, of course, that my improved method is not limited to use with the particular apparatus thus shown and described, but that other forms of reaction tanks or towers may be substituted.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In a method of making magnesium sulphate, the step which consists in lowering the chloride content of concentrated magnesium sulphate liquor containing chloride impurities by breaking up such chloride.

2. In a method of making magnesium sulphate from magnesium hydroxide containing chloride impurities, the steps which consist in intermixing an excess of sulphuric acid with concentrated magnesium sulphate mother liquor from a previous run, such acid and liquor being heated removing evolved hydrochloric acid in gaseous form, and adding the liquid mixture to magnesium hydroxide.

3. In a method of making magnesium sulphate from magnesium hydroxide containing chloride impurities, the steps which consist in subjecting concentrated magnesium sulphate mother liquor from a previous run to the action of sulphuric acid, such acid being in excess of the amount required to react with the chlorides present in such liquor and both acid and liquor being heated to a temperature of at least 90° C. removing evolved hydrochloric acid in gaseous form, and adding the liquid mixture to magnesium hydroxide.

4. In a method of making magnesium sulphate from magnesium hydroxide containing chloride impurities, the steps which consist in continuously intermixing sulphuric acid with concentrated magnesium sulphate mother liquor from a previous run, such acid being in excess of the amount required to react with the chlorides present in such liquor and being heated to a temperature of approximately 120° C., and such liquor being heated to from 90° to 95° C., removing evolved hydrochloric acid in gasous form, and adding the liquid mixture to a fresh lot of magnesium hydroxide.

5. In a method of making magnesium sulphate, the steps which consist in lowering the chloride content by adding sulphuric acid to the liquor, and subsequently neutralizing such acid with magnesium base.

6. In a method of making magnesium sulphate, the step which consists in adding hot concentrated sulphuric acid to hot concentrated mother liquor.

7. In a method of making magnesium sulphate where magnesium hydroxide containing chloride impurities is employed, the steps which consist in eliminating chlorine by admixing sulphuric acid, and subsequently neutralizing such acid with magnesium hydroxide.

8. In a method of making magnesium sulphate where sulphuric acid is reacted with a magnesium base, the steps which consist in mixing the sulphuric acid hot with hot mother liquor, and then reacting upon the magnesium base with the mixture in proportion to obtain neutral magnesium sulphate solution, filtering such solution, cooling to separate magnesium sulphate, and returning the mother liquor to the first step.

Signed by me this 19th day of February, 1925.

SHELDON B. HEATH.